United States Patent [19]

Fabris

[11] 4,067,420
[45] Jan. 10, 1978

[54] DISC BRAKE

[75] Inventor: Claude Robert Fabris, Champigny-sur-Marne, France

[73] Assignee: Societe Anonyme Francaise du Ferodo, Paris, France

[21] Appl. No.: 750,378

[22] Filed: Dec. 14, 1976

[30] Foreign Application Priority Data

Dec. 19, 1975 France .............................. 75.38972

[51] Int. Cl.² ............................................ B60T 13/74
[52] U.S. Cl. ................................... 188/171; 188/72.3
[58] Field of Search ................. 188/72.1, 72.3, 106 R, 188/171

[56] References Cited

U.S. PATENT DOCUMENTS

| 3,115,956 | 12/1963 | Trombetta | 188/171 |
| 3,520,386 | 7/1970 | Rogier | 188/171 |
| 3,830,344 | 8/1974 | Cervenec et al. | 188/171 |

Primary Examiner—Duane A. Reger
Attorney, Agent, or Firm—Diller, Brown, Ramik & Wight

[57] ABSTRACT

A disk brake, preferably for use in connection with industrial machinery, has a pair of braking levers which carry at one end brake shoes located on opposite sides of the disk. The braking levers are operatively interconnected at the end opposite the brake shoes, and emergency on/off control means are provided which includes gripping means urging one of the braking levers into braking contact with the disk; electromagnetic release means are provided operable to oppose the action of the gripping means. Progressively acting control means in the form of an electromagnet are also provided adapted to act on one of the braking levers.

11 Claims, 7 Drawing Figures

DISC BRAKE

BACKGROUND OF THE INVENTION

The present invention relates generally to disk brakes, and refers more particularly to disk brakes which are usually fitted to industrial apparatus such as for example a travelling crane, for effecting the emergency stopping of an output shaft of a motor in the apparatus, or of a member fastened to the output shaft.

More precisely, the present invention relates to emergency brakes of this kind which comprise a frame, a rotating disk joined to the member which is to be braked, to brake shoes disposed one on each side of the disk, braking levers on which the shoes are articulated by pivots or pivot means and which are articulated to one another by pivots or pivot means, and an on/off control means acting on the braking levers and comprising resilient gripping means adapted to urge normally at least one of the braking levers in a direction corresponding to the gripping of the disk, and electromagnetic release means which, when operated, oppose the action of the gripping means.

A brake of this type is described in French Patent No. 1,476,750 and also in the first Patent of Addition thereto, No. 91440.

Because of its construction, a brake of this kind is not capable of progressive action, so that in cases where it is desirable to be able to effect progressive braking of the disk, it is usual to associate with it a second brake disposed in parallel and operable on the same disk for effecting progressive deceleration in the usual manner.

This arrangement thus requires the utilisation of two separate brakes on the same disk.

Apart from the fact that this arrangement is expensive, it is not always possible for reasons of space.

In order to overcome this disadvantage, it has already been proposed in French Patent No. 1,563,082 to equip the brake in question with a dual control system, that it to say to provide it, in parallel with its on/off control means, with a progressively acting control means adapted to act on one of the brake levers with which it is equipped, in a direction corresponding to the gripping of the disk in question.

However, in the practical embodiments proposed for this purpose in the aforesaid patent, which are satisfactory in most applications and which in particular have the advantage of enabling the effects of the two control means to be added together if desired, the progressively acting control means is a hydraulic control means in order to limit as much as possible the lateral dimension of the unit, so that for the operation of the brake in question it is necessary to provide on the one hand electric cables capable of supplying the electromagnetic release means provided in the on/off control means, and in addition piping capable of supplying fluid under pressure to the progressively acting control means.

For certain applications, and particularly in the case of travelling cranes, the presence of piping of this kind may be awkward and dangerous, and/or the response time of the corresponding control may be too long.

The main object of the present invention is to provide various improvements to disk brakes of the kind concerned which minimise or avoid these disadvantages.

SUMMARY

According to one of these improvements the progressively acting control means is an electromagnetic control means, and accordingly the disk brake of the invention requires only electric cables for its operation.

According to another improvement the progressively acting control means is provided in the usual manner with a mobile element adapted to act on the braking lever concerned, and this mobile element extends generally along an axis of movement extending parallel to and at a distance from the axis of movement of the electromagnetic release means with which the on/off control means is provided, and acts on the braking lever concerned with the aid of a transmission lever articulated or pivoted at a fixed point fastened to the frame.

Because of the action of this transmission lever, the advantage is gained that the force developed by the mobile element of this "controlled" control element is stepped down when the latter is brought into operation.

In addition, because of this transmission lever, the progressively acting control means may advantageously be installed vertically in line with the on/off control means, instead of in the axis of the said on/off control means, which latter arrangement increases the lateral dimensions of the whole arrangement.

Furthermore, despite the fact that the position of the progressively acting control means is thus offset radially in relation to that of the on/off control means, this transmission lever enables the effective axis of movement of the progressively acting control means to be in practice identical with the axis of movement of the on/off control means, which makes it possible for the progressively acting control means to enjoy the benefits, under the best possible conditions, of the automatic means taking up play due to the wear of the friction linings of the brake shoes with which the on/off control means is of course equipped in the usual manner.

Bearing in mind the fact that this facility for taking up play is essential for an electromagnetic control arrangement, and also bearing in mind the fact that the space usually available parallel to the axis of the disk and vertically in line with the on/off control means permits the effective utilisation of an electromagnetic control means of this kind at that point, the two improvements forming the object of the invention which have been briefly explained above can advantageously be utilised together in one and the same brake, their effects being combined to give a particularly favourable construction.

DESCRIPTION OF THE PREFERRED EMBODIMENT

Figure 1:
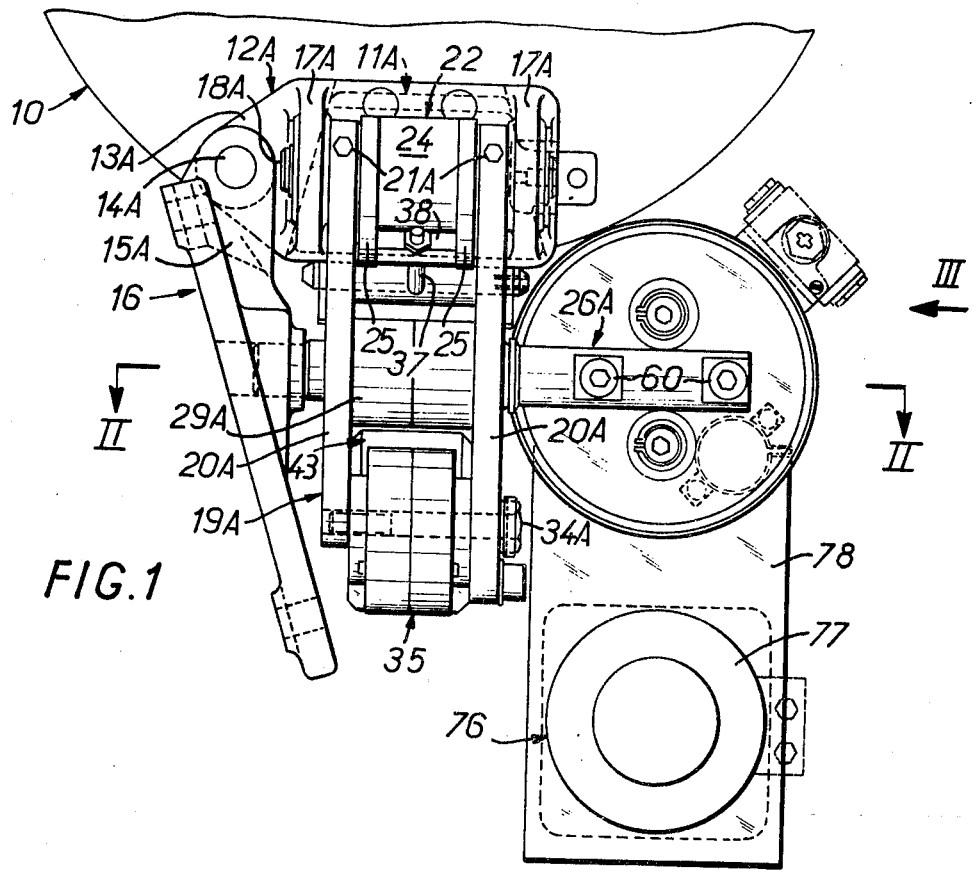
FIG. 1 is a view in elevation of a disk brake according to the invention.
Figure 3:
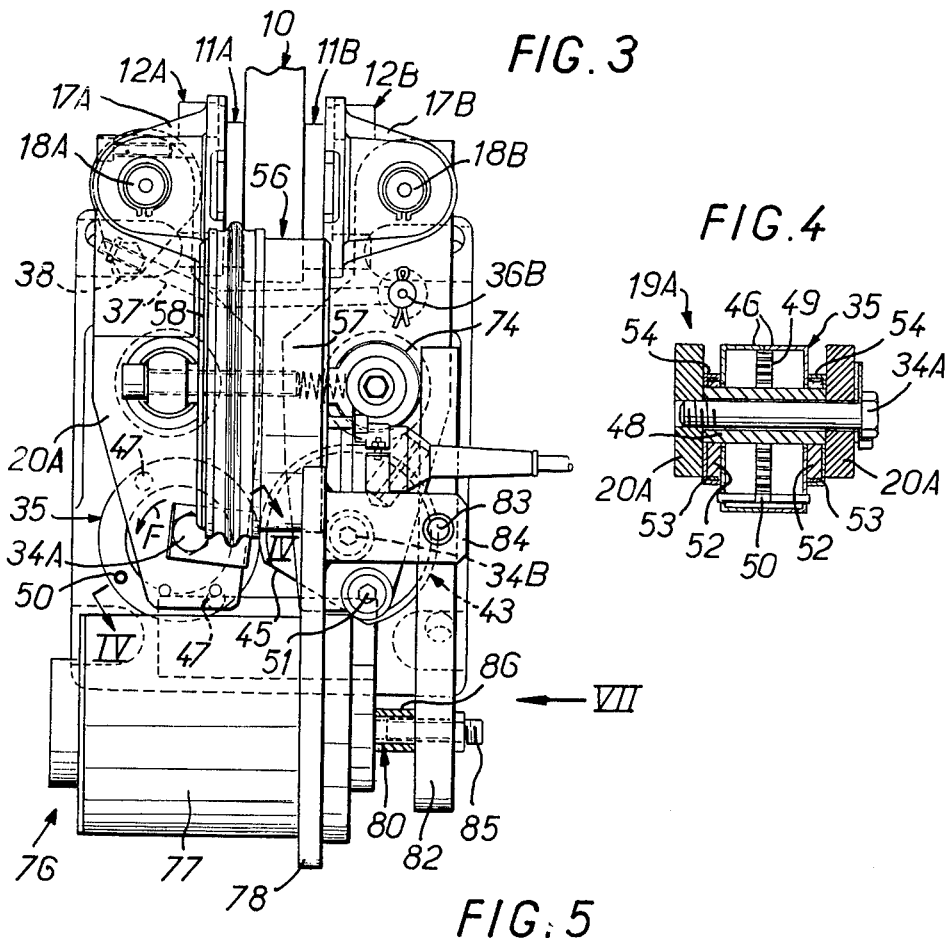
FIG. 3 is a side view of the brake in the direction of the arrow III in FIG. 1.

In FIGS. 1 and 3 the disk 10 which is to be braked is shown only partially.

Two brake blocks 11A, 11B are disposed one on each side of this disk; these brake blocks are constructed in known manner and will not be described in detail here, but broadly they comprise a friction lining and a lining carrier plate which are attached, in a known manner to brake shoes 12A, 12B.

As can best be seen in FIG. 1, the shoe 12A is provided longitudinally with a lug 13A which is pivotally connected to a fixed pin 14A carried by a yoke 15A fastened to a frame base 16.

The brake shoe 12A is also provided transversely with two lugs 17A on which is engaged a pivot 18A permitting its connection to a braking lever 19A.

This braking lever 19A is composed of two parallel plates 20A which are engaged on the pivot 18A and which are clamped to the latter with the aid of screws 21A, the corresponding ends of these plates 20A being suitably slit to permit this clamping.

Between the ends in question of the plate 20A is disposed a freewheel or one-way bearing 22 of which the inner cage, not visible in the drawings, is fastened on the pivot 18A, while its outer cage 24 carries laterally two cheeks 25 between the plates 20A.

In its median zone the braking lever 19A is pivotally connected to a pillar 26A (FIGS. 1 and 2) which is carried by the frame base 16 and which has its corresponding end 27A inserted into a hole 28A provided for the purpose in the said base.

In practice the braking lever 19A is pivotal about the pillar 26A.

For operating the brake lever, the two plates 20A of which the lever is composed are connected to one another by a sleeve 29A which is formed of two half-sleeves suitable facing one another axially at their corresponding ends and which serves to receive the outer cage 30A of a ball joint 31A whose inner cage 32A is engaged on the pillar 26A and is suitably fastened axially on the latter by resilient split rings.

At their opposite ends to the pivot 18A, the plates 20A of the brake lever 19A are connected to one another by a pin 34A on which is eccentrically mounted a cylindrical cam 35 which will be described in detail later on.

In a similar arrangement which will not be described in detail here, the brake shoe 12B is pivotally connected by a longitudinal lug to the frame base 16, and by transverse lugs 17B, through which a pivot 18B passes, to a braking lever 19B.

Like the braking lever 19A, the braking lever 19B is composed of two parallel plates 20B, and these are connected to one another by a pin 36B to which is connected a bent tie-rod 37, which at its other end is connected to a cross-member 38 connecting together the cheeks 25 fastened to the outer cage 24 of the freewheel 22.

In its median zone the braking lever 19B is pivotally connected, in the same manner as described above in connection with the braking lever 19A and the pillar 26A, to a pillar 26B carried, parallel to the pillar 26A, by the frame base 16.

However, unlike the pillar 26A, the pillar 26B is not fastened in the frame base 16; on the contrary, it is mounted in the base in a ball joint.

In practice the pillar 26B carries at its corresponding end (FIG. 2) the inner cage 39 of a ball joint 40 whose outer cage 41 is fastened to the frame base 16.

At its opposite end to the brake shoe 12B the braking lever 19B is provided with a fixed stop 43 for cooperation with the cam 35 with which the braking lever 19A is equipped.

In the example illustrated in FIG. 3, the fixed stop 43 is composed of a cylindrical roller centred on a pin 34B connecting together the two plates 20B of which the braking lever 19B is composed, this cylindrical roller having locally on its periphery a flat 45 interrupting its external cylindrical surface.

By means of a pin 51 the roller forming the stop 43 is fastened on the braking lever 19B in a position in which the cam 35 bears against it at a distance from its flat 45.

As will be understood, the cam 35 of the braking lever 19A and the stop 43 of the braking lever 19B together constitute pivot means by which the said levers are operably interconnected.

In practice the cam 35 is subjected to the action of resilient means which urge it to rotate about the pin 34A carrying it, in such a manner that it normally remains in contact with the fixed stop 43 carried by the braking lever 19B.

In the example illustrated these resilient means are accomodated acutally inside the cam 35.

Figure 4:
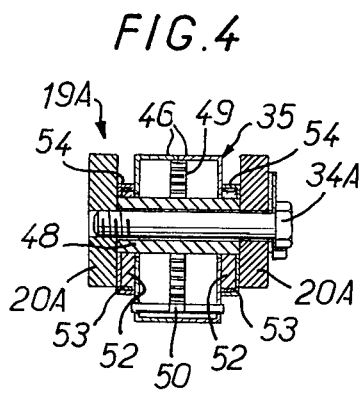
FIG. 4 is a view in partial section on the line IV—IV in FIG. 3.

In practice, and as can best be seen in FIG. 4, the cam 35 is composed of two bell-shaped shells which have their concavities turned towards one another and have their free edges suitable facing one another, and which are joined together for example by screws 47 (FIG. 3).

The cam 35 composed in this manner is mounted for rotation about a sleeve 48 which spaced apart the plates 20A of which the braking lever 19A is composed, around the pin 34A connecting these plates to one another, the sleeve 48 being clamped between the said plates so as to be rotationally fixed in relation to them.

In the internal space formed by the shells 46 of which the cam 35 is composed, there is located a spiral spring 49 the inner end of which is fastened to the sleeve 48, while its outer end is fastened to a pin 50 connecting the shells 46 and extending parallel to the pin 34A.

This spiral spring 49 constitutes the resilient return means associated with the cam 35.

Outside the cam 35, there is disposed on each side a ring 52 surrounded by an annular sealing washer 53, the assembly comprising the ring and washer being covered by a protective cover 54.

A brake of this kind is usually provided with an on/off control means 55 which is adapted to act on the braking levers 19A, 19B, and which comprises resilient gripping means adapted normally to urge one of the said braking levers in a direction corresponding to the gripping of the disk 10, and electromagnetic release means operable to oppose the action of these gripping means.

In practice, and as illustrated, these electromagnetic release means are composed of an electromagnet 56, which is disposed between the pillars 26A and 26B, and which comprises a yoke connected to the fixed pillar 26A and a movable armature 58.

The yoke 57 is held at a distance from the pillar 26A by spacer sleeves 59 (FIG. 2) on which the armature 58 is slidably mounted. The yoke 57 is joined to the pillar 26A by screws 60 which pass through the armature 58 with the aid of the spacer sleeves 59 and which are engaged by screwing into tapped holes 61 provided for the purpose in the yoke 57 and which pass right through the yoke.

The ball-joint mounted pillar 26B is connected to a tie rod 63 which passes axially through the yoke 57, which is provided with an axial cavity 64 for this purpose, and through the armature 58 associated with the said yoke, making use of a passage 65 provided in the armature; beyond the latter the tie rod 63 has a shoulder 66 against which the armature can be caused to bear under the action of a spring 68 which is disposed in the axial cavity 64 in the yoke 57 and which lies between the armature 59 and a stopper 69 axially closing the cavity 64 at the opposite end to where the armature is disposed, this spring constituting the resilient gripping means of the on/off control means 55.

The tie rod 63 passes freely through the armature 58 and therefore participates in the movement of the armature only in the direction of displacement which corresponds to the action on the armature of the spring 68.

In the case in question this is the direction of displacement of the armature in which its moves away from the yoke 57 with which it is associated.

For the purpose of its connection to the ball-joint mounted pillar 26B, the tie rod 63 is provided in the example illustrated with a lug 70 by which it is engaged on the corresponding end of the pillar.

In practice, in the example illustrated this lug carries internally the outer annular element 71 of a ball joint 72 whose inner annular element 73 is carried by the pillar 26B.

For reasons which will be explained, in practice the outer surface 74 of the lug 70 of the tie rod 63 is of toric shape.

As will easily be understood, by means of the armature 58, the tie rod 63, and the pillar 26B, the spring 68 is able to urge the braking lever 19B in the direction of the braking lever 19A for the purpose of gripping the disk 10.

Resilient return means are associated with the ball joint mounted pillar 26B, and urge the latter in the opposite direction to that in which the spring 68 urges the movable armature 58.

In the example illustrated these resilient return meand comprise a spring 75 (FIGS. 2 and 3) which is at least partly accommodated in one of the holes 61 provided in the yoke 57, beyond the corresponding screw 60, and which bears directly on the ball-joint mounted pillar 26B, being supported against the end of the said screw.

In parallel to the on/off control means 55 there is provided a progressively acting control means 76 adapted to act, when instructed, on one of the braking levers 19A, 19B in a direction corresponding to the gripping of the disk 10.

The braking lever on which this progressively acting control means can thus act is the same as that which can also be acted on by the spring 68 constituting the resilient gripping means with which the on/off control means is provided.

In the present condition therefore, this lever is the braking lever 19B, which is pivotally connected to the ball-joint mounted pillar 26B on which the spring 68 can act with the aid of the movable armature 58 and the tie rod 63.

As illustrated, the progressively acting control means 76 is preferably an electromagnet, which constitutes a controlled control element thereof.

The fixed element of this control means, namely a coil 77, is fastened to the yoke 57 of the electromagnet 56 with which the on/off control means 55 is provided, and in practice, and as illustrated, this fixed element 77 is carried by a plate 78 which is fixed to the yoke 57 and which extends generally parallel to the disk 10 (FIGS. 1 and 3).

Conjointly, the movable element or core 80, which is provided for controlled element constituting the electromagnet forming the progressively acting control means 76 for acting on the braking lever 19B concerned, extends generally in the direction of an axis of movement parallel to and at a distance from the axis of movement of the electromagnet 56 constituting the electromagnetic release means with which the on/off control means 55 is provided, and acts on the braking lever 19B with the aid of a transmission lever 82 pivoted at a fixed point on the frame base 16.

In the example illustrated, this transmission lever 82 is movable about a pivot 83 carried by a yoke 84 fastened to a fixed part, for example the plate 78 fastening the yoke 57 to the fixed element 77, and/or fastened to the said yoke 57.

At one of its ends this transmission lever 82, which is a simple quadrangular plate, carries a stud 85 which is adjustable in position, for examle a screw as illustrated, on which the corresponding end of the core constituting the movable element 80 of the progressively acting control means 76 can act under the protection of a guard sleeve 86.

At its other end the transmission lever 82 acts on the tie rod 63 connected to the ball-joint mounted pillar 26B.

As illustrated, it is preferable for the transmission lever 82 simply to bear against the outer toric surface 74 of the lug 70.

In accordance with the usual arrangement which will not be described in detail here, pins are provided for connection of the windings of the electromagnets 56 and 76.

Figure 7:
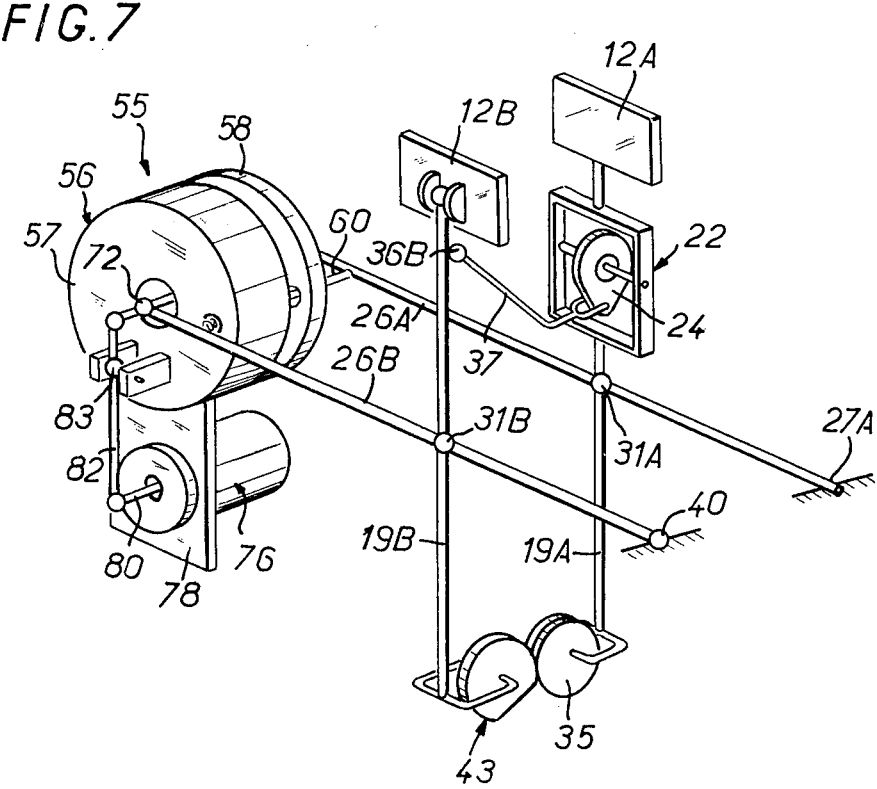
FIG. 7 is a diagrammatical view in perspective illustrating the general arrangement of the various component elements of the brake according to the invention, viewed in the direction of the arrow VII in FIG. 3.

Referring now to the functioning of the brake, this is illustrated schematically in FIG. 7, and it will first be assumed that the coil of the electromagnet 56 with which the on/off control means is provided is not under current.

Figure 2:
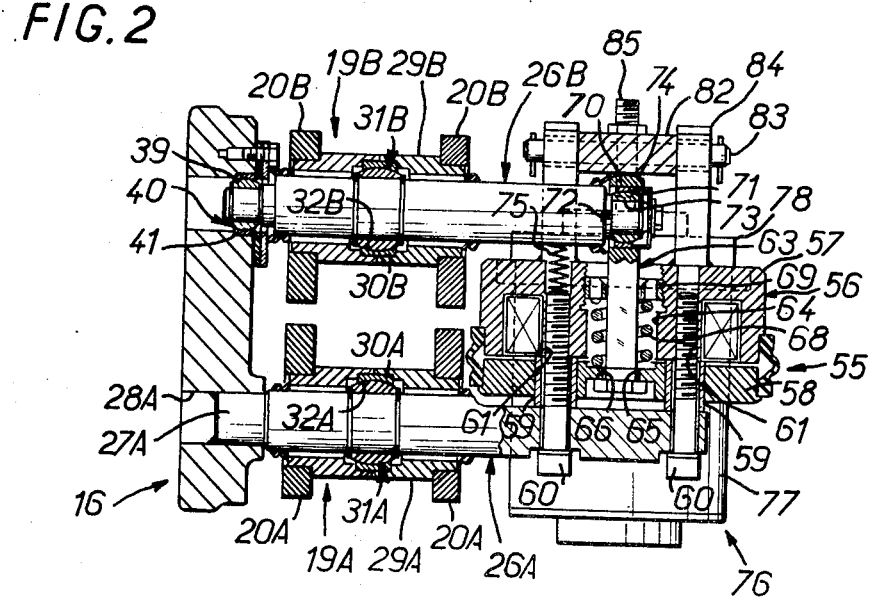
FIG. 2 is a view in section of the brake taken on the line II-II in FIG. 1.

In this case the movable armature 58, which is not attracted by the yoke 57 with which it is associated, is pushed back by the spring 68, and by bearing against the shoulder 66 of the tie rod 63 it urges the latter, and therefore also the ball-joint mounted pillar 26B to which it is connected, in the direction of the fixed pillar 26A, FIG. 2.

Consequently, the braking lever 19B which is pivotally connected to the ball-joint mounted pillar 26B, is subjected in its median zone to a closing action urging it in the direction of the braking lever 19A.

Since at their opposite ends to the brake shoes 12A, 12B, the braking levers 19A, 19B are operably interconnected by the cam 35 and the stop 43 carried by them, the closing action applied to the braking lever 19B by the spring 68 leads to a relative approaching movement of the brake shoes 12A, 12B in relation to one another, and therefore to the gripping of the disk 10.

Thus, as long as the electromagnet 56 is not supplied with current, or when it is deprived of current, the disk 10 is automatically gripped mechanically by the action of the spring 68.

As will have been understood, the movement of mutual approach of the brake shoes 12A, 12B which is necessary for this gripping is made possible because it corresponds to the direction of relative rotation of the braking levers 19A, 19B about the pillars 26A, 26B in which the outer cage 24 of the freewheel 22 can turn freely about the inner cage with which it is associated, and in practice the braking levers 19A, 19B spontaneously assume a position of equilibrium about the only fixed point constituted by the fixed pillar 26A in relation to the entire kinematic chain connecting the brake shoe 12A to the brake shoe 12B by pivots or pivot means and levers.

Figure 5:
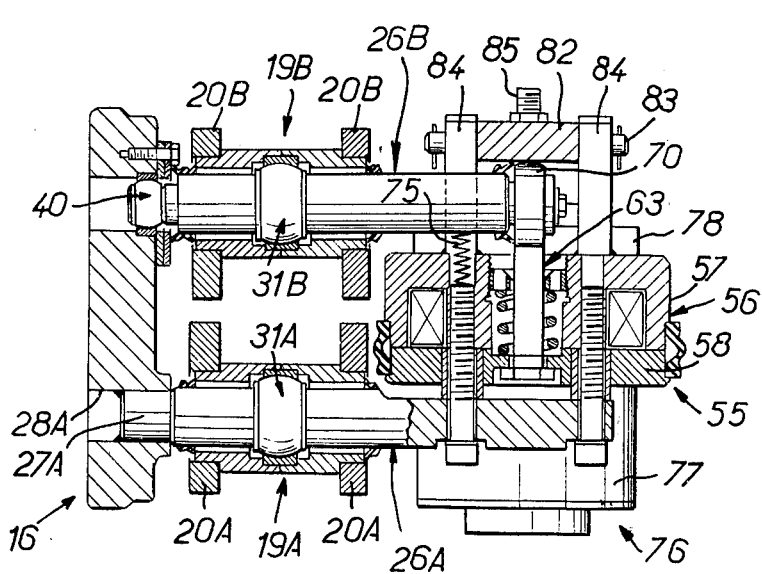
FIGS. 5 and 6 are views generally similar to that in FIG. 2 and illustrate the functioning of the brake of the invention.

When the winding of the electromagnet 56 of the on/off control means 56 is supplied with current, the movable armature 58 associated with the yoke of this electromagnet is brought back into contact with the yoke (FIG. 5) against the action of the spring 68, which is compressed.

The return spring 75 associated with the ball-joint mounted pivot 26B pushes back the latter so that the tie rod 63 remains bearing by its shoulder 66 against the movable armature 58.

The ball joint mounted pillar 26B therefore moves away from the fixed pillar 26A and tends at the same time to move the braking lever 19B away from the braking lever 19A.

In a first phase, the braking levers 19A, 19B still being interconnected by the cam 35 and the stop 33 with which they are provided, the relative opening movement to which they are subjected leads in practice to a relative opening movement of the brake shoes 12A, 12B in relation to one another.

However, the relative opening movement of the brake shoes 12A, 12B then corresponds to the direction of rotation of the freewheel 22 in which the outer cage 24 is prevented from turning in relation to the inner cage with which it is associated, and this relative opening movement of the brake shoes 12A, 12B consequently can take place only within the limits of the play or inherent elasticity which inevitably exists between the outer cage and the inner cage of the freewheel, this play or inherent elasticity being found in practice to be sufficient for effecting the release of the disk 10.

Since the braking levers 19A, 19B are still subjected to a relative opening movement because of the action applied to the pillar 26B by the return spring 75 associated with it, and since these braking levers 19A, 19B consequently bear against the inner cage and the outer cage of the freewheel 22, this relative opening movement now causes the cam 35 carried by the braking lever 19A to move slightly away from the stop 43 carried by the braking lever 19B.

Because the cam 35 momentarily no longer bears against the stop 43, it is freed in respect of rotation and under the action of the spiral spring 49, turns in a direction such as to cause it to bear against the stop 43 again, as indicated by the arrow F in FIG. 3.

This action results in an increase of the distance separating the pins 34A, 44A on which the cam 35 and the stop 43 are engaged respectively and which constitute the support base by which the braking levers 19A, 19B are interconnected.

This increase is of such a nature as to compensate for play due to the wear of the friction linings of the brake blocks 11A, 11B carried by the brake shoes 12A, 12B in the course of the preceding braking period.

It will now be assumed that, the disk 10 being released, it is desirable to effect a progressive braking operation.

It is then necessary to make use of the progressively acting control means 76 by suitably supplying current to the windings of the electromagnet constituting this control means.

Figure 6:
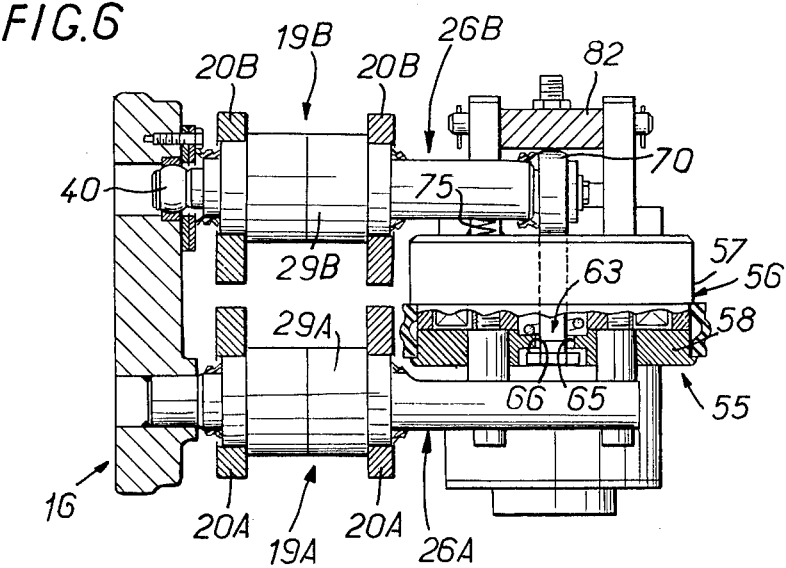

In proportion to this supply of current, the movable core 80 of the electromagnet pushes back the transmission lever 82 with the aid of the stud 85 on which it acts (FIG. 3), and this transmission lever 82 in turn pushes back, at its other end (FIG. 6), the tie rod 63 connected to the ball-joint mounted pillar 26B; the latter is thus subjected to a movement in the direction of the fixed pillar 26A, which in turn leads by a similar process to that described above in the gripping of the disk 10.

As will have been understood, the action of the transmisson lever 82 on the tie rod 63 is made possible because, for its corresponding direction of displacement, the tie rod is disconnected from the mobile armature 58, while the latter remains in contact with the yoke 57 with which it is associated.

As will also have been understood, the return spring 75 associated with the ball-joint mounted pillar 26B caused the latter to assume, when at rest, a determined reference position by means of which the progressively acting control means 76 makes the best possible use of the device for automatically taking up play due to wear, which device is the case of the on/off control means 55, as described above, comprises the freewheel 22 and the cam 35.

Finally, as will have been understood, the transmission lever 82 which provides an advantageous step-down ratio for the force exerted by the progressively acting control means 76 in effecting the gripping of the disk 10, is preferably of metal and is held in contact with the lug 70 of the tie rod 63 simply by a magnetic attraction resulting from the electromagnetic leaks which originate from the electromagnet 56 and which are channeled by the tie rod.

Because of the toric contour of the outer surface of the lug 70, this tie rod 63 moreover makes it possible to take into account any non-alignment of the transmission lever 82 in relation to it.

Furthermore, in order to change the brake blocks, it is only necessary to move the braking levers sufficiently apart, to remove the pin 51, and to turn the stop 43 so as to bring its flat 45 opposite the cam 35.

The present invention is not limited to the embodiment described and illustrated, but includes any modified embodiments within the scope of the appended claims.

In particular, a return spring may be disposed from one braking lever to the other, at the end of these levers carrying the brake shoes, in order to counterbalance the action of the spiral return spring associated with the cam 35 and to prevent permanent contact between the brake shoes and the disk 10 when the latter is released.

I claim:

1. A disk brake, particularly for industrial purposes, comprising a frame, a rotatable disk for connection to the member which is to be braked, two brake shoes disposed respectively one on each side of the disk, braking levers to which the said shoes are pivotally connected, and which braking levers are operatively pivotally interconnected, an on/off control means acting on the said braking levers and comprising resilient gripping means adapted normally to urge one of the said brake levers in a direction corresponding to the gripping of the disk, electromagnetic release means operable to oppose the action of the said gripping means, and progressively acting control means adapted to act as one of the said braking levers in a direction corresponding to the gripping of the disk, the said progressively acting control means comprising an electromagnet whose movable element is adapted to act on the associated braking lever.

2. A disk brake according to claim 1, wherein the movable element of the electromagnet extends generally in the direction of an axis of movement parallel to and at a distance from the axis of movement of the electromagnetic release means with which the on/off control means is provided, and acts on the braking lever concerned through the medium of a transmission lever pivotally mounted at a fixed point on the frame.

3. A disk brake according to claim 2, wherein the transmission lever associated with the movable element of the progressively acting control means is pivotally mounted on a fork fastened to the fixed yoke of the electromagnetic release means with which the on/off control means is provided.

4. A disk brake according to claim 2, wherein the control means act on the braking levers through pillars which are carried by the frame, one of said pillars being fixed to the frame and the other being mounted in a ball joint, braking levers being pivotally connected to the pillars and the yoke of the electromagnetic release means being connected to the fixed pillar, while the other pillar, which is ball-joint mounted, is connected to a tie rod which passes axially through the said yoke and through the movable armature associated therewith and which has a shoulder beyond the said armature, and the resilient gripping means with which said on/off control means is also provided act on the said armature in a direction in which the latter is urged to bear against said shoulder of the tie rod, and wherein the transmission lever associated with the progressively acting control means acts on the tie rod connected to the ball-joint mounted pillar.

5. A disk brake according to claim 4, wherein the transmission lever bears against the tie rod.

6. A disk brake according to claim 4, wherein the tie rod is provided with a lug by which it is engaged on the ball-joint mounted pillar and whose outer surface is acted on by the transmission lever associated with the progressively acting control means, and wherein the outer surface of the lug of the tie rod is toric.

7. A disk brake according to claim 2, in which the fixed element of the progressively acting control means is fastened to the yoke of the electromagnetic release means, and the said fixed element is carried by a plate which is fastened to said yoke and which extends generally parallel to the disk.

8. A disk brake according to claim 1, in which the control means associated with the braking levers act on the levers through the medium of pillars which are carried by the frame, one of said pillars being fixed to the frame and the other being mounted in a ball-joint, and the said braking levers are pivotally connected to said pillars, the yoke of the electromagnetic release means with which the on/off control means is provided being connected to the fixed pillar by screws which pass through the associated armature and which are engaged in tapped holes extending through the said yoke, and the pillar which is ball-joint mounted is connected to a tie rod which passes axially through the said yoke and the movable armature associated with the latter and which beyond the said armature is provided with a shoulder, the resilient gripping means with which the aforesaid on/off control means is also provided acting on said armature to urge the armature to bear against the aforesaid shoulder on the tie rod, the braking lever on which the progressively acting control means acts is that which is connected to the ball-joint mounted pillar, and resilient return means are provided adapted to urge the ball-joint mounted pillar in a direction opposite to that in which the resilient gripping means urge the movable armature of the electromagnetic release means, and the yoke of the electromagnetic release means is connected to the fixed pillar by screws which pass through the associated armature and which are engaged in tapped holes extending through said yoke, the resilient return means associated with the ball-joint mounted pillar comprising at least one spring accommodated at least partly in one of the said holes beyond the corresponding screw, and bearing against the fixed pillar.

9. A disk brake according to claim 1, in which the pivot means by which the two braking levers are operatively interconnected comprise a cam which is mounted for rotation on one of the said braking levers and which is subjected to the action of resilient means which urge it to rotate in such a manner that it normally remains in contact with a fixed stop carried by the other of the said braking levers, the said resilient means being accommodated inside the said cam.

10. A disk brake according to claim 9, wherein said resilient means comprise a spiral spring.

11. A disk brake according to claim 9, wherein the cam is formed of two generally bell-shaped shells whose concavities are turned towards one another and whose free edges face one another and are joined together.

* * * * *